(12) United States Patent
Heikamp et al.

(10) Patent No.: US 7,309,367 B2
(45) Date of Patent: Dec. 18, 2007

(54) OIL SEPARATOR

(75) Inventors: Wolfgang Heikamp, Waldsee (DE);
Markus Zuerker, Dudenhofen (DE);
Manfred Kuehlborn, Speyer (DE)

(73) Assignee: Mann & Hummel GmbH,
Ludwigsburg (DE)

( * ) Notice: Subject to any disclaimer, the term of this patent is extended or adjusted under 35 U.S.C. 154(b) by 0 days.

(21) Appl. No.: 11/580,146

(22) Filed: Oct. 13, 2006

(65) Prior Publication Data
US 2007/0084157 A1    Apr. 19, 2007

Related U.S. Application Data

(63) Continuation of application No. PCT/EP2005/051590, filed on Apr. 11, 2005.

(30) Foreign Application Priority Data
Apr. 14, 2004    (DE) .................. 10 2004 018 019

(51) Int. Cl.
*B01D 5/00* (2006.01)
(52) U.S. Cl. ................... 55/321; 55/327; 55/330; 55/385.4
(58) Field of Classification Search ............. 55/310, 55/320, 322, 323, 327, 330, 332, 333, 385.4
See application file for complete search history.

(56) References Cited

U.S. PATENT DOCUMENTS

| | | | |
|---|---|---|---|
| 4,251,238 A * | 2/1981 | Claes et al. ............ 95/278 |
| 4,331,460 A * | 5/1982 | Dillmann et al. ............ 55/485 |
| 4,666,473 A | 5/1987 | Gerdau |
| 6,723,149 B2 * | 4/2004 | Ernst et al. ............ 55/498 |
| 6,858,051 B2 * | 2/2005 | Uhlenbrock ............ 55/321 |
| 6,962,615 B2 * | 11/2005 | Staudenmayer et al. ...... 55/486 |

FOREIGN PATENT DOCUMENTS

| | | |
|---|---|---|
| DE | 3703271 C1 | 5/1988 |
| DE | 44 07 177 A1 | 9/1995 |
| EP | 0 592 869 B1 | 4/1994 |

* cited by examiner

*Primary Examiner*—Duane Smith
*Assistant Examiner*—Sonji Turner
(74) *Attorney, Agent, or Firm*—Crowell & Moring LLP

(57) ABSTRACT

An oil separator for separating entrained oil from a gas stream, the separator being arranged on a housing wall which divides a housing interior from a housing exterior. A support tube, which is arranged inside an outer casing and carries a filter element on its outer circumference through which gas can flow radially. The support tube is closed at its upper axial end face and communicates at its lower axial end face with the housing interior. An impingement separator is arranged in the vicinity of the lower axial end face of the support tube. The outer casing is closed at its bottom relative to the housing in a sealed manner.

8 Claims, 1 Drawing Sheet

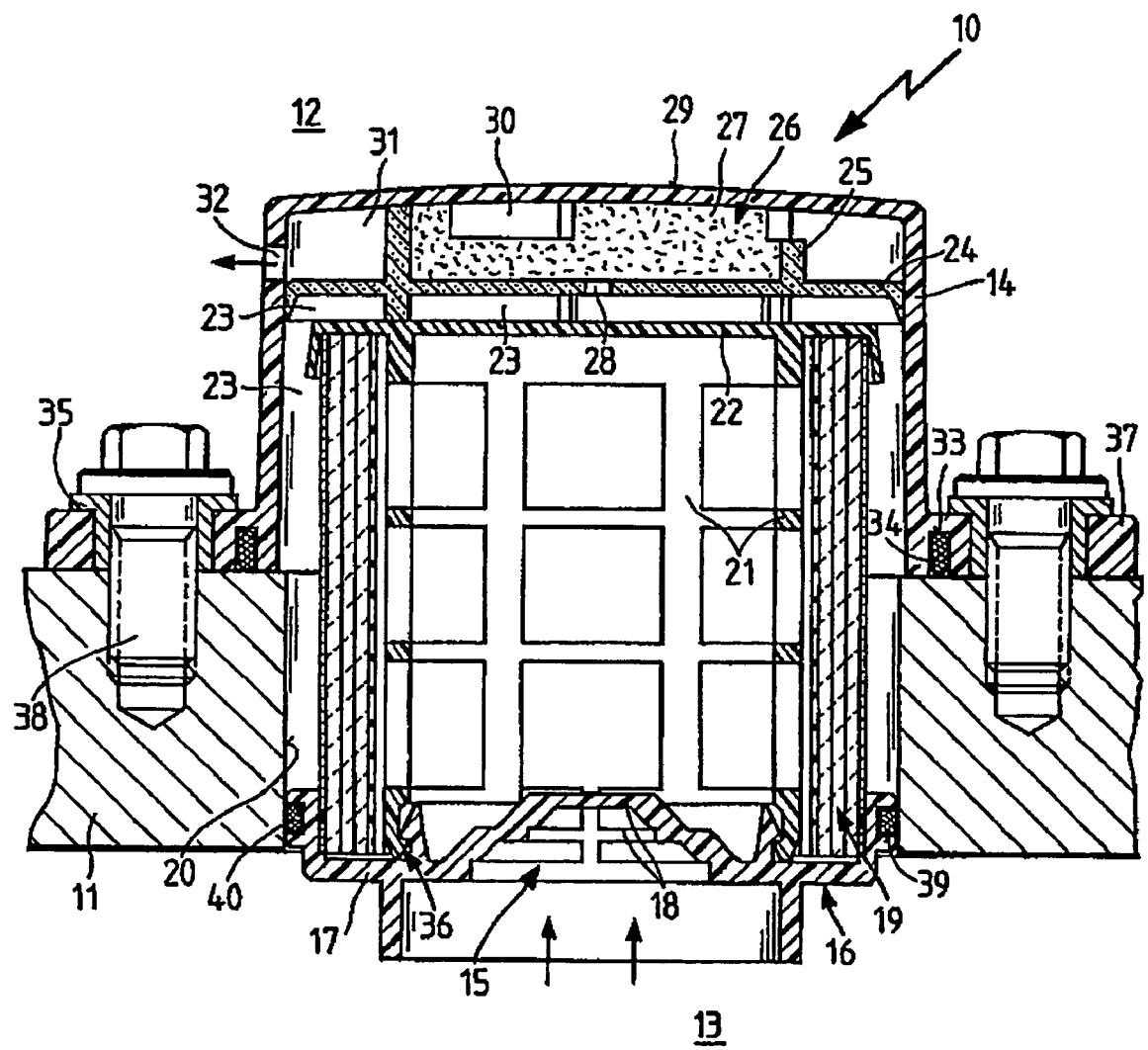

OIL SEPARATOR

CROSS REFERENCE TO RELATED APPLICATIONS

This application is a continuation of international patent application no. PCT/EP2005/051590, filed Apr. 11, 2005, designating the United States of America and published in German on Oct. 27, 2005 as WO 2005/099868, the entire disclosure of which is incorporated herein by reference. Priority is claimed based on Federal Republic of Germany patent application no. DE 10 2004 018 019.9, filed Apr. 14, 2004.

BACKGROUND OF THE INVENTION

The present invention relates to an oil separator for separating oil from a gas stream, and to the use of an oil separator according to the invention in a ventilation filter for a thermodynamic retarder.

Oil separators of this type are often mounted on oil tanks or housings in which the oil flows in and out subject to function. This presents the problem of separating the amounts of oil contained in the outflowing air in the form of droplets or slugs to minimize or entirely eliminate oil emissions. The oil separator is simultaneously used to clean the air from dust and dirt particles as it enters the housing. Separators of this type are required to ensure maximum separation efficiency and minimum pressure loss.

DE 44 07 177 discloses an oil tank ventilation filter that is connected to a housing by a connecting piece and has a radial flow through a filter element. The filter element is protected by an outer casing, such that flow toward the outside occurs through the bottom of the outer casing. To prevent the separated oil from dripping toward the outside, a baffle is mounted on the inside of the outer casing, which allows the separated oil to drip into a collection trough and flow back into the tank.

A drawback in this embodiment is that the filter element is the only separation stage and thus fails to take into account that an oil-laden air stream can contain oil in different forms, e.g., as slugs or large droplets. Furthermore, the cross-sectional narrowing of the flange increases flow resistance. Since the oil is collected on the outside of the filter medium, the collected oil may slop over, e.g., in moving vehicles.

SUMMARY OF THE INVENTION

Accordingly, it is an object of the present invention to provide an improved oil separator.

Another object of the invention is to provide an oil separator that ensures maximum separation efficiency with minimum pressure loss.

A further object of the invention is to provide an oil separator that minimizes the risk of oil spillage.

These and other objects are achieved in accordance with the present invention by providing an oil separator for separating oil from a gas stream, the oil separator being disposed on a housing wall which divides a housing interior from a housing exterior, the oil separator comprising a support tube disposed within an outer casing sealingly connected to the housing, the support tube carrying a filter element around its circumference and being capable of receiving radial flow, the support tube further being closed at its upper end face and communicating at its lower end face with the housing interior, and the oil separator further comprising an impingement separator disposed in the area of the lower end face of the support tube.

The oil separator according to the invention for separating oil from a gas stream is disposed in a housing, in the interior of which a given amount of oil is stored and which is separated from an outside. The oil separator is flanged to the housing by a flanged connection and in a partial area is integrated into the housing. The oil separator is enclosed by an outer casing and is closed relative to the outside by a closed end face.

Within the outer casing is disposed a support tube that can receive radial flow and carries a filter element. The support tube has a closed upper end face and a lower end face that is open toward the inside of the housing. A filter element encloses the support tube from the upper to the lower end face. At their lower end face, the support tube and the filter element are enclosed by an annular end disk such that the end disk protrudes beyond a radial outer side of the filter element.

The end disk, which is open on the inside of the support tube, seals the filter element radially against the housing along the outside of the filter element. Normally, this seal between the end disk and a communicating seal contour of the housing is ensured by a radial sealing ring. The outer casing as well as the filter element and the support tube are cylindrical. The receiving surface for the radial seal of the lower end disk can be a pipe stub integrated into the housing, or the oil separator is adapted such that the end disk is positioned in the area of the wall thickness of the housing.

The air outlets in the outer casing, which are preferably disposed radially in the upper area of the oil separator, communicate with the outside. Apertured receiving lugs are disposed around the circumference of the oil separator to enable the oil separator to be affixed to the housing by screws. The preferred material for the outer casing and the end disks, or the end face disks, and the support tube is polyamide. However, polyamide combined with metals may also be selected, for example, for the support tube. The end disk is preferably fastened to the center tube by clips and may additionally be glued to the center tube to provide a tight connection.

The oil-laden gas stream thus flows radially outwardly through the support tube and the filter element and is then guided to the exterior through the radial air outlets. The separated oil particles accumulate along the inside of the outer casing and, following gravity, flow away within the annular space between the filter element and the outer casing toward the inside of the housing and reach the inside of the housing after passing through the filter element. This return flow process of the separated oil is accelerated at the latest when there is a functional flow reversal from the outside toward the inside of the housing.

A suitable filter medium is a nonwoven metal material formed of metal fibers, such that the fiber thickness can be adapted to the required separation efficiency and the required pressure loss. To affix the nonwoven filter, the outside of the nonwoven material is covered with a polyamide layer. On the inside, the filter element is supported by the support tube. Here, a polyester nonwoven material may be provided in addition.

The end disk disposed on the lower end of the support tube carries an impingement separator as an additional preseparator element. This preseparator may be mounted in the form of impingement plates that are offset in height and interconnected by a web, so that oil in the form of slugs or spatters is retained by these impingement plates and flows back into the interior of the housing. Preferably, two or more impingement plates are disposed at an angle or horizontally, so that the oil can bounce off the surfaces of a plurality of plates and flow back. The plates are preferably angled in such a way that the separated oil can flow back into the inside of the housing.

Thus, the invention advantageously uses a plurality of separating elements in one device. This makes it possible to use the oil separator for gas streams carrying droplets of different sizes, such that even oil in the form of slugs and spatters is retained by the flow guides of the oil separator. In addition, the oil previously separated at the outer casing is prevented from reaching the outside.

This multi-stage separation makes it possible to adjust the oil separator to combine high separation efficiency with low, almost negligible, pressure loss. These characteristics enable the oil separator to be used in areas in which, according to the prior art, much more complex separation mechanisms had to be installed. The invention also helps meet the continuously increasing requirements to reduce emissions.

In accordance with one advantageous embodiment of the invention, gaps are formed between the air outlet and the filter element, at least one of which is a condensate separation chamber or space. These additional separation spaces may enclose the filter element radially or may be disposed between the upper end face of the support tube and the end face of the outer casing. The separation relative to the condensate separation space must thus be provided by perforated rings or perforated disks. Since the thermoconductive heating surface for condensation should be as large as possible. One advantageous solution is to dispose a simple metal braiding inside the condensate separation space.

A possible alternative to the wire braiding is plate-shaped metal arrangements. When relatively large planar condensation structures are employed, they may also be used as separation members between the spaces or as support members for the oil separator. Whereas large condensation elements must be fixed inside the condensate separation space by bonding or connecting elements or must be adapted to the size of the condensate space. A steel braiding whose volume is adapted approximately to the condensate separation space can be simply inserted into the condensate separation space and fixed in position relative to the installation space by its elasticity.

Ideally, a defined opening is provided in the center of the condensate separation space through which the oil-laden gas stream enters. In addition, at the outer peripheral surface of the condensate separation space, a plurality of air outlets are formed through which the gas stream flows toward the outside. This ensures a uniform flow around the condensation element and maximum condensate separation.

The condensate separation space is laterally enclosed by barrier members, which prevent the condensing oil from flowing to the air outlet. Ideally, the lower end faces of the condensate space are sloped toward the inlet opening of the condensate separation space to ensure that the separated oil flows away in the direction of the inside of the housing. The arrangement of a condensate separation space has the advantage that any oil droplets still present in the gas stream are separated and emissions are thus further reduced. Since this type of oil separation allows large flow cross sections, separation can be effected with minimum flow resistance.

In accordance with another advantageous embodiment of the invention, the condensate separation space receives flow from the filter medium through a defined opening. This defined opening is disposed in the center of the condensate separation space and represents a limiting flow cross section.

A single defined opening is advantageous because the risk of clogging increases if the flow cross section is distributed over a plurality of smaller openings. Only if the flow cross sections are correspondingly large does it make sense to provide a plurality of openings.

In principle, the openings may be adapted to the functional requirements of the oil separator. These requirements are determined by the function of the housing in which the oil separator is installed. The primary requirement to be mentioned is the volumetric flow rate used to ventilate the housing. In the housing of a thermodynamic retarder, for example, this volumetric flow rate is decisive for the response time of the unit and thus for the braking rate. To vary the ventilation rate of the housing, valves may be used to open additional cross-sectional flows that bypass the defined opening through a bypass opening as needed during the ventilation cycle of the housing. This defined opening for limiting the volumetric flow rate makes it possible to regulate the flow in an advantageous and simple manner without any additional components. It is simple and economical to manufacture and is moreover fully integrated into the oil separator.

Yet another advantageous embodiment of the invention is obtained particularly with the aforementioned condensate separation space. The condensate separation space preferably receives flow through the center and has outlets or discharge openings on its exterior faces. To prevent the separated oil from going through the discharge openings, the discharge openings are formed in the boundary wall substantially above the lower end face of the condensate separation space. Thus, the lateral boundary faces form a barrier that prevents the separated oil from getting beyond the discharge openings.

The air outlets of the separation space do not necessarily have to lead directly to the outside but may also be separated from the air outlet by a gap. Preferably, the lower end faces of the separation space are sloped inwardly to allow the separated oil to drip toward the filter medium. This barrier-type enclosure of the condensate separation space advantageously retains the condensed oil and further minimizes the discharge of oil to the outside of the oil separator.

In accordance with yet another advantageous embodiment of the invention, the air outlet through which the gas reaches the exterior is disposed on the lateral peripheral faces of the oil separator. Ideally, there is a gap between the air outlet and the discharge openings of the condensate separation space, such that the bottom of the gap is preferably sloped toward the air outlet. The air outlet is flush with the lower edge of the gap. This arrangement advantageously prevents any water that may appear on the outside of the oil separator during cleaning or as a result of weather influences from getting into the interior of the oil separator or into the condensate separation space or from penetrating the filter element. Water penetration is made more difficult because of the lateral arrangements. Should water nevertheless get into the gap, it is retained by the barriers separating the gap from the condensate separation space. Because of the outwardly sloped lower end face of the gap the water will tend to flow toward the air outlet. Depending on the installation situation of the oil separator, a plurality of air outlets may be provided in the outer casing.

Yet another advantageous embodiment of the invention relates to the impingement separator on the lower end face. This impingement separator preferably protrudes into the support tube of the oil separator and has a plurality of horizontally superimposed separation surfaces. The separator elements substantially overlap horizontally and are interconnected vertically by webs. This arrangement results in the impingement separator having a labyrinth-type flow cross section, which guides the gas stream along a cascade type course. The gas stream is diverted at the individual separator elements so that the oil particles impinge against the separator elements and then drip toward the inside of the housing of the oil separator due to gravity. Ideally, the separator elements are sloped in such a way that the separated oil always drips toward the inside of the housing. This advantageous arrangement of the impingement separator causes larger oil droplets or spatters to be separated at an early stage during inflow into the support tube.

The oil separator according to the invention is suitable, in particular, for use as a ventilation filter for the housing of a thermodynamic retarder. To maximize the flow cross section and thereby minimize the flow resistance of the oil separator, the outer casing of the oil separator is flanged to a communicating contour of the retarder housing. Preferably, axial sealing grooves are formed on the lateral surface and seal the lateral surface relative to the retarder housing. Fixation is preferably effected using apertured lugs formed in the outer casing and a screwed connection. The entire filter element, including the support tube, extends through this arrangement into the interior of the housing, such that the support tube or the impingement separator receive flow freely without any further narrowing in the housing. This satisfies the requirement for maximum flow rate and minimum pressure loss. Advantageously, by using the oil separator according to the invention together with the retarder housing, the entire combined separation function is used. Impingement separator, filter element and condensate separation are arranged so that they directly communicate inside a housing. This makes possible a structurally space saving configuration and economical manufacture.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to an illustrative preferred embodiment shown in the accompanying drawing FIGURE which is a sectional view of an oil separator constructed in accordance with the present invention.

DETAILED DESCRIPTION OF PREFERRED EMBODIMENTS

In the FIGURE, the oil separator 10 is flanged to a housing 11 (only part of which is shown) and secured by screw connections 38. An impingement separator 15, a filter element 19 and a condensate separation space 26 are accommodated within the outer casing 14. The outer casing 14 encloses the oil separator 10 around the periphery and is constructed as an integral unit with an end face of the outer casing 29. As an alternative to this embodiment, the end face of the outer casing 29 may also be constructed as a separate element and fastened to the outer casing 14. In addition, apertured receiving lugs 37 are formed on the outer casing 14, which are tightened to the housing 11 by a screwed connection 38 using metal bushings 35. To terminate the outer casing 14 on the housing 11 so as to form a seal, an elastomer seal 34 is seated in a circumferential groove 33 to produce a tight connection with the housing surface. Thus, the interior of the housing 13 is separated from the exterior 12, and the gas stream must flow through the oil separator 10 and all its separation stages (15, 19, 26). Inside the outer casing 14 is a support tube 21, the periphery of which is enclosed by the filter element 19. An upper end face 22 of the support tube 21 is closed and the peripheral sides of the support tube 21 have a grid-shaped configuration and are thus gas permeable. The bottom end of the support tube 21 has an end disk 17, which is fastened to the support tube 21 by a snap connection 36, so that the filter element 19 is positively locked in place between the upper end face 22 and the lower end face 16. To stabilize the connection and to ensure tightness, the filter element 19 additionally can be bonded to the end faces. This bonded connection may be formed, for example, by fusion welding or a single or multi-component adhesive. At the lower end disk 17 is formed a circumferential radial groove 39, which in combination with an O-ring 40 inserted therein produces a tight connection relative to the cylindrical receiving surface 20 of the housing 11. In the area within the support tube 21, the end face 17 is provided with separator members 18 mutually offset in longitudinal direction forming an impingement separator 15. The separator members 18 are arranged to overlap horizontally so that a cascade-type flow path is created for the outflowing gases or oil vapors. The outflowing vapors thus flow from the housing 13 toward the exterior 12 through the impingement separator into the center tube and must flow radially through the filter element 19 that encloses the support tube 21. A separation space 23 is present between the upper end face 22 of the support tube 21 and the separation member 24 located above the support tube 21. This separation space 23 also annularly encloses the filter element 19. An annular condensate separation space 26 is located between the separation member 24 and the end face of the outer casing 29. The condensate separation space 26 does not extend over the entire diameter of the oil separator 10 but only over a reduced circular area. The condensate separation space 26 communicates with the separation space 23 through a defined opening 28. Radially, the condensate separation space 26 is bounded by barrier members 25 which extend axially up to the end face of the outer casing 29. Toward the end face of the external shell 29 there are radial outflow openings 30 communicating with the gap 31. A metal braid 27 is disposed within the condensate separation space 26 on which the oil vapor condenses, accumulating on the separation member 24. The condensate separation space 26 is thus annularly enclosed by the gap 31.

The illustrated embodiment has only one air outlet 32 but a plurality of outflow openings 30 between the condensate separation space 26 and the gap 31. This ensures a uniform radial flow through the condensate separation space 26. The support tube 21 is axially fixed in the outer casing 14 by securing elements (not shown) between the outer casing 14 and the upper end face 22 of the support tube 21. This fixation can be provided, for example, by pinning, screwing or also by bonding. Clipping to the outer casing 14 is, of course, also feasible.

As an alternative to this embodiment, it is also feasible to fix the support tube 21 axially to the end face of the outer casing 29. This fixation can extend through the separation member 24 or can be provided by the separation member 24 itself. In the latter case, a type of concatenated clipping can occur between the end face of the outer casing 29, the separation member 24 and the support tube 21. Because only the upper end face 22 of the support tube 21 is axially fixed in the embodiment shown, the separation member 24 is clamped between the end face of the outer casing 29 and the upper end face 22. Thus, the gas stream flows through the impingement separator 15 into the support tube, which causes larger droplets to be separated. Subsequently, the gas stream flows radially through the support tube 21 and the filter element 19 so that smaller oil particles are absorbed by the filter element. Thereafter, the gas stream flows through the separation space 23 and through the defined opening 28 into the center of the condensate separation space 26, flowing radially through this space from the inside to the outside and then through the discharge opening 30 into the gap 31. Any oil droplets present in the form of oil vapor are separated in the condensate separation space 26. Because the volume of the oil separator receiving flow is functionally limited as a rule and the outflow phase is followed by an inflow phase, the separated oil flows out of the condensate separation space 26 through the defined opening 28 back into the separation space 23, so that it is pulled through the filter element 19 again by the return flow and gravity and flows through the impingement separator 15 back into the interior of the housing 13.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An oil separator for separating oil from a gas stream, said oil separator being disposed on a housing wall which divides a housing interior from a housing exterior, said oil separator comprising a support tube disposed within an outer casing sealingly connected to said housing, said support tube carrying a filter element around its circumference and being capable of receiving radial flow, said support tube further being closed at its upper end face and communicating at its lower end face with said housing interior, and said oil separator further comprising an impingement separator disposed in the area of the lower end face of the support tube.

2. An oil separator according to claim 1, wherein gaps are provided between the outer casing and the filter element, and at least one of said gaps constitutes a condensate separation space.

3. An oil separator according to claim 2, wherein further comprising metallic condensate members disposed in the condensate separation space.

4. An oil separator according to claim 2, wherein the condensate separation space has an inlet opening of defined size which limits the gas stream relative to the flow side of the filter element.

5. An oil separator according to claim 1, further comprising barrier members disposed in the condensate separation space such that condensed oil can flow off toward the interior of the housing.

6. An oil separator according to claim 1, wherein at least one air outlet is provided in the outer casing for discharging the gas stream to the outside.

7. An oil separator according to claim 1, wherein the impingement separator has a labyrinth configuration so that the gas stream must follow a cascade-like course.

8. In combination, a thermodynamic retarder and an oil separator according to claim 1.

* * * * *